(12) United States Patent
Dale et al.

(10) Patent No.: US 10,533,437 B2
(45) Date of Patent: Jan. 14, 2020

(54) INNER DIFFUSER CASE FOR A GAS TURBINE ENGINE

(71) Applicant: United Technologies Corporation, Farmington, CT (US)

(72) Inventors: Timothy Dale, Manchester, CT (US); Swati G. Bhanderi, New Britain, CT (US)

(73) Assignee: United Technologies Corporation, Farmington, CT (US)

( * ) Notice: Subject to any disclaimer, the term of this patent is extended or adjusted under 35 U.S.C. 154(b) by 767 days.

(21) Appl. No.: 15/029,474

(22) PCT Filed: Oct. 31, 2014

(86) PCT No.: PCT/US2014/063427
§ 371 (c)(1),
(2) Date: Apr. 14, 2016

(87) PCT Pub. No.: WO2015/066473
PCT Pub. Date: May 7, 2015

(65) Prior Publication Data
US 2016/0265371 A1    Sep. 15, 2016

Related U.S. Application Data

(60) Provisional application No. 61/899,520, filed on Nov. 4, 2013.

(51) Int. Cl.
*F01D 9/02* (2006.01)
*F01D 25/30* (2006.01)
*F01D 25/24* (2006.01)
*F23R 3/04* (2006.01)
*F23R 3/50* (2006.01)
*F23R 3/10* (2006.01)

(52) U.S. Cl.
CPC ............... *F01D 9/02* (2013.01); *F01D 25/24* (2013.01); *F01D 25/243* (2013.01); *F01D 25/246* (2013.01); *F01D 25/30* (2013.01); *F23R 3/04* (2013.01); *F23R 3/10* (2013.01); *F23R 3/50* (2013.01); *F05D 2220/32* (2013.01); *F05D 2240/35* (2013.01); *F05D 2260/941* (2013.01); *Y02T 50/675* (2013.01)

(58) Field of Classification Search
CPC ...... F23R 3/04; F23R 3/10; F23R 3/50; F23R 3/54; B64D 27/10; F04D 29/444; F04D 29/542; F01D 9/02; F01D 25/24; F01D 25/243; F01D 25/246; F01D 25/30; F05D 2250/52; F05D 2220/32; F05D 2240/35; F05D 2260/941; Y02T 50/675
See application file for complete search history.

(56) References Cited

U.S. PATENT DOCUMENTS

| 4,483,149 A | 11/1984 | Rider et al. |
| 4,503,668 A | 3/1985 | Duncan, III et al. |
| 5,165,850 A * | 11/1992 | Humke .................... F01D 25/24 415/135 |
| 5,791,148 A * | 8/1998 | Burrus ...................... F01D 5/18 60/749 |

(Continued)

*Primary Examiner* — Jason H Duger
(74) *Attorney, Agent, or Firm* — O'Shea Getz P.C.

(57) ABSTRACT

A combustor section of a gas turbine engine has a diffuser case with a structural cone having variable wall thicknesses strategically located for reducing localized stress in the cone.

20 Claims, 5 Drawing Sheets

(56) References Cited

U.S. PATENT DOCUMENTS

| | | | |
|---|---|---|---|
| 7,197,882 B2* | 4/2007 | Marnas | F04D 29/542 415/207 |
| 2005/0172632 A1 | 8/2005 | Mamas et al. | |
| 2010/0316484 A1 | 12/2010 | Jasko et al. | |

* cited by examiner

INNER DIFFUSER CASE FOR A GAS TURBINE ENGINE

This application claims priority to PCT Patent Application No. PCT/US14/063427 filed Oct. 31, 2014 which claims priority to U.S. Patent Application No. 61/899,520 filed Nov. 4, 2013, which are hereby incorporated herein by reference in their entireties.

BACKGROUND

The present disclosure relates to a gas turbine engine and, more particularly, to an inner diffuser case of the engine.

Gas turbine engines, such as those that power modern commercial and military aircraft, generally include a compressor to pressurize an airflow, a combustor for burning a hydrocarbon fuel in the presence of the pressurized air, and a turbine to extract energy from the resultant combustion gases. The compressed air from the compressor section passes between stator vanes, then through a diffuser section. The diffuser has an expanding cross sectional area in the direction of the airflow to decrease the velocity and increase the static pressure of the air. This prepares the air for entry into a combustion section at low velocity to permit proper mixing with fuel.

In gas turbine engines of the twin spool type, leakage of high pressure compressor discharge air through a labyrinth seal between a high pressure compressor rear rotor shaft and the diffuser section typically establishes the thrust loads on component parts such as thrust bearings.

This air is also used downstream in the engine for cooling purposes, particularly, the bearing compartment and the high pressure turbine. Air that is cooler than the environment surrounding the bearing compartment, is bled from the mid-stage compressor either through an anti-vortex tube directing the compressor bleed air radially inward to the engine's shaft where it flows axially to the environment surrounding the mid-frame bearing compartment, or externally from the mid high pressure compressor case to the bearing compartment, then used to supply cooling to portions of the high pressure turbine rotor.

The diffuser case generally divides or separates the leaked high pressure compressor discharge air and compressor bleed air from the high pressure compressor discharge air (or core airflow) used for combustion in the combustor section. Due to thermal transients, the diffuser case experiences localized stress points. Such stress points are often located near or at locations where two components attach. Localized stresses can reduce the useful life of the diffuser case and increase maintenance.

SUMMARY

A diffuser case for use in a gas turbine engine according to one non-limiting embodiment of the present disclosure includes a structural cone having a variable wall thickness for the reduction of thermal induced stress.

In a further embodiment of the foregoing embodiment the structural cone is centered about an axis and has a stress region subject to a localized stress, and a compliance feature proximate the stress region and a segment adjacent the compliance feature, and wherein the compliance feature has a first wall thickness that is less than a second wall thickness of the segment.

In the alternative or additionally thereto, in the foregoing embodiment a strut projects radially inward from and is engaged to the structural cone, and wherein the stress region is proximate the strut.

In the alternative or additionally thereto, in the foregoing embodiment the strut is hollow for air flow.

In the alternative or additionally thereto, in the foregoing embodiment a flange is coupled to the structural cone and the compliance feature and the segment are included in a circumferentially continuous first portion and the flange is disposed upstream from the first portion and centered about the axis.

In the alternative or additionally thereto, in the foregoing embodiment the first wall thickness is about thirty-five percent less than the second wall thickness.

In the alternative or additionally thereto, in the foregoing embodiment a circumferentially continuous first portion has the compliance feature and the segment, and a second portion is engaged to and concentrically disposed downstream from the first portion, and wherein the second portion has the stress region.

In the alternative or additionally thereto, in the foregoing embodiment an outer shroud is centered about the axis, and wherein the outer shroud is disposed radially inward from and is engaged to the second portion and the strut projects radially inward from the outer shroud.

In the alternative or additionally thereto, in the foregoing embodiment the structural cone has a third portion engaged to and spanning axially between the flange and the first portion.

In the alternative or additionally thereto, in the foregoing embodiment the second and third portions have respective wall thicknesses that are about equal to the second wall thickness and the first wall thickness is about fifteen percent less than the second wall thickness.

In the alternative or additionally thereto, in the foregoing embodiment the flange is substantially annular in shape and projects radially outward from the third portion.

In the alternative or additionally thereto, in the foregoing embodiment the strut is one of a plurality of struts being circumferentially spaced from one another and each substantially lies in an imaginary plane that intersects along the axis, and the localized stress is one of a plurality of localized stresses where each one is proximate to a respective strut.

In the alternative or additionally thereto, in the foregoing embodiment the compliance feature is circumferentially continuous and the segment is circumferentially continuous, and the segment is located axially between the compliance feature and the flange for structural rigidity of the flange.

In the alternative or additionally thereto, in the foregoing embodiment the segment is one of a plurality of segments spaced circumferentially from one another about the axis, and the compliance feature is one of a plurality of compliance features space circumferentially about the axis by respective adjacent segments.

A combustor section of a gas turbine engine according to another disclosed non-limiting embodiment of the present disclosure includes a diffuser case having an annular structural cone concentric to an engine axis with the structural cone having a first wall thickness and a second wall thickness, and wherein the first wall thickness is less than the second wall thickness and the first wall thickness is proximate to a stress region in the structural cone.

In the alternative or additionally thereto, in the foregoing embodiment an annular flange of the diffuser case is engaged to and disposed upstream from the structural case, and a first portion of the structural cone has the first and second wall thicknesses, and a second portion of the structural cone is located downstream of and concentric to the first portion, and the second portion has the stress region.

In the alternative or additionally thereto, in the foregoing embodiment a strut is disposed radially inward from and extends radially outward for engagement to the second portion, and the stress region is generally aligned circumferentially and is disposed radially outward from the strut.

In the alternative or additionally thereto, in the foregoing embodiment a compliant feature of the first portion has the first wall thickness, and a segment of the first portion has the second wall thickness, and the compliant feature and the segment are circumferentially continuous and the compliant feature is spaced axially downstream from the flange by at least the segment.

In the alternative or additionally thereto, in the foregoing embodiment the strut is one of a plurality of struts spaced circumferentially from one another, and a plurality of compliant features of the first portion each has the first wall thickness and each one of the plurality of compliant features are circumferentially aligned and disposed radially outward from a respective strut of the plurality of struts.

In a further embodiment of the foregoing embodiment, an inner diffuser case of a gas turbine engine has a flange, a cone engaged to the flange and having a stress region and a compliance feature disposed between the stress region and the flange, and wherein the compliance feature is spaced from the flange for maintaining engagement integrity of the flange and structural rigidity of the cone.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
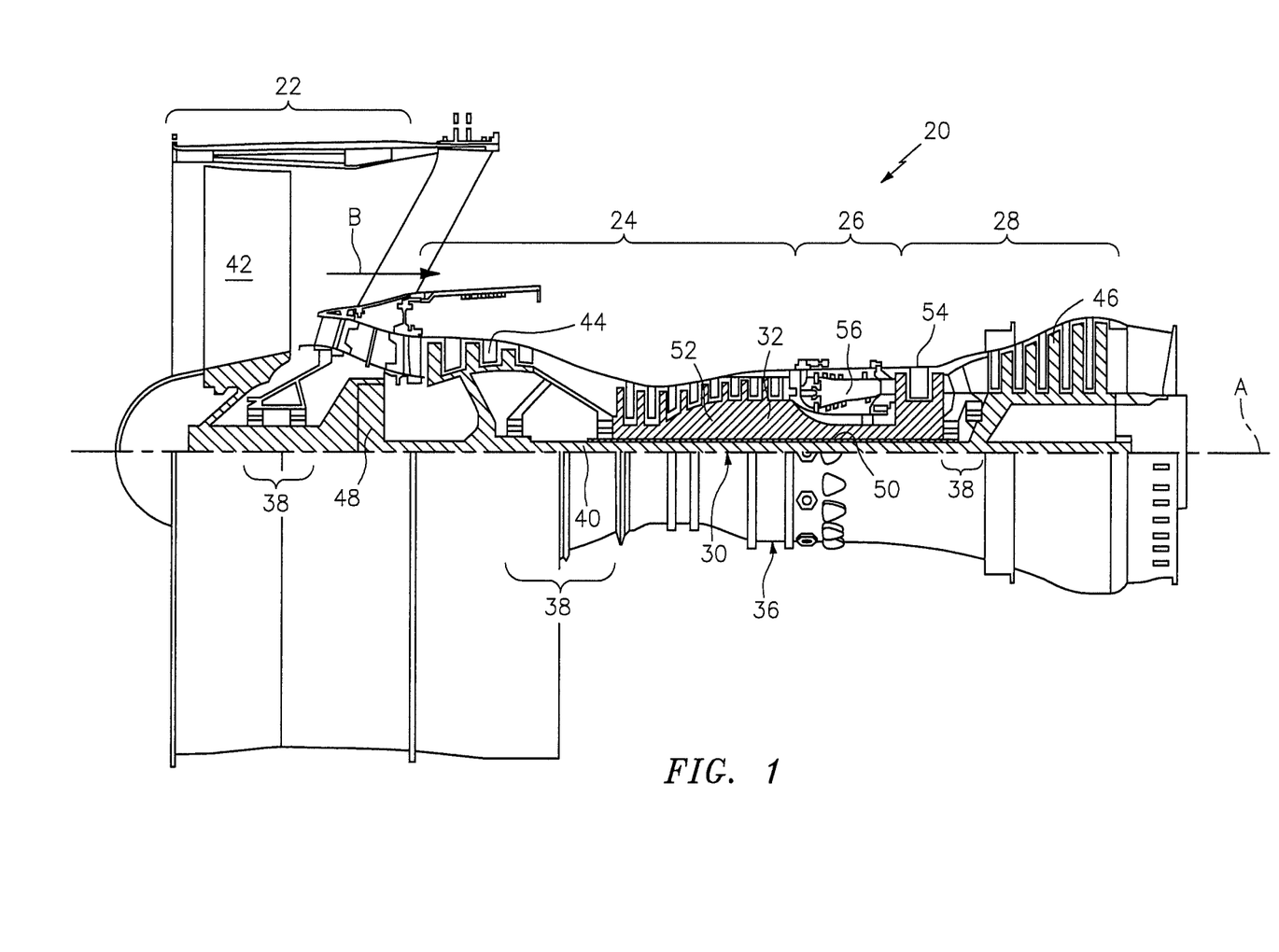
FIG. 1 is a schematic cross-sectional view of a gas turbine engine having an inner diffuser case in accordance with various embodiments of the present disclosure.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiments, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7$^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 2:
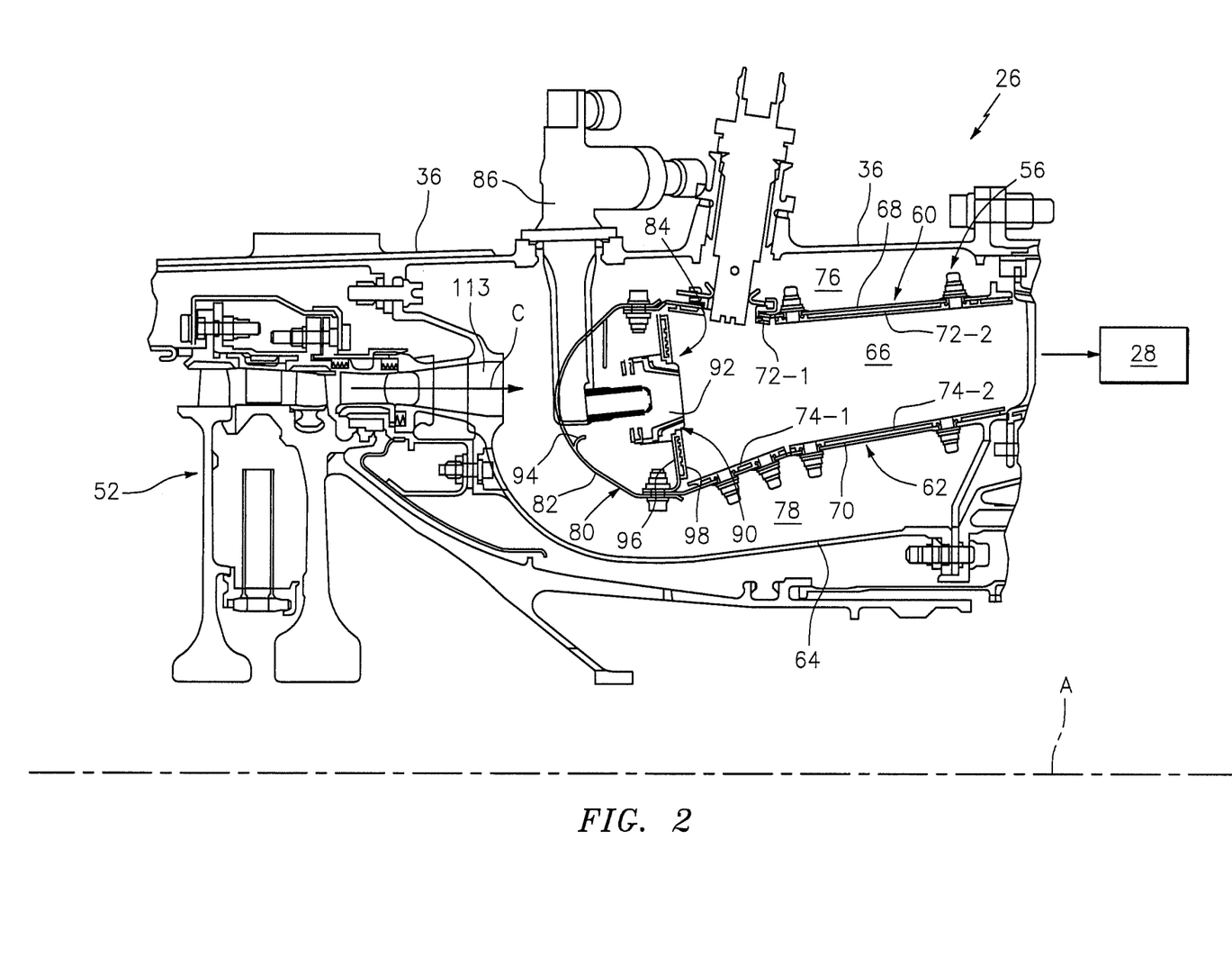
FIG. 2 is a partial longitudinal cross-sectional view of a combustor section of the gas turbine engine.

With reference to FIG. 2, the combustor 56 may be annular and generally includes an outer combustor wall 60 and an inner combustor wall 62. The outer combustor wall 60 and the inner combustor wall 62 are spaced apart radially with respect to axis A and such that a combustion chamber 66 is generally defined therebetween. The combustion chamber 66 is generally annular in shape. The outer combustor wall 60 is spaced radially inward from the engine case 36 defining an annular outer plenum 76 therebetween. The portion of the engine case 36 that extends through the combustor section 26 may also be an outer diffuser case disengageably attached to the remainder of case 36. The inner combustor wall 62 is spaced radially outward from an inner diffuser case 64 of the combustor section 26 defining an annular inner plenum 78 therebetween. It should be understood that although a particular combustor is illustrated and described herein, other combustor types with various combustor liners and/or case arrangements will also benefit from the various embodiments of the present disclosure.

Each combustor wall 60, 62 generally includes a respective support shell 68, 70 that supports one or more liners 72, 74 mounted to a hot side of the respective support shell 68, 70. The liners 72, 74 directly define the combustion chamber 66 that contains the flow of combustion products for driving the turbine section 28, The liners 72, 74 are often comprised of a plurality of Impingement Film Float (IFF) wall panels orientated in a generally rectilinear liner array. Each panel may be manufactured of, for example, a nickel based super alloy, ceramic or other temperature resistant material. In one disclosed non-limiting embodiment, the array includes a plurality of forward liner panels 72-1 and a plurality of aft liner panels 72-2 that line and face the hot side of the outer shell 68 and a plurality of forward liner panels 74-1 and a plurality of aft liner panels 74-2 that line and face the hot side of the inner shell 70.

The combustor 56 further includes a forward assembly 80 immediately located downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor walls 60, 62, and a multiple of circumferentially distributed bulkhead heatshield segments 98 secured to the bulkhead support shell 96 around the central opening 92.

The annular hood 82 spans radially between, and is secured to, the forwardmost ends of the combustor walls 60, 62. The annular hood 82 includes a multiple of circumferentially distributed hood ports 94 that accommodate a respective one of the fuel nozzles 86 and introduce air into the forward end of the combustion chamber 66 through a central opening 92. Each fuel nozzle 86 may be secured to the engine case 36 and project through one of the hood ports 94 and through the central opening 92 within the respective fuel nozzle guide 90.

The forward assembly 80 introduces a portion of core compressor air C into the forward end of the combustion chamber 66 while the remainder of air C enters the annular outer plenum 76 and the annular inner plenum 78. The multiple of fuel nozzles 86 and surrounding structure generate a blended fuel-air mixture that supports combustion in the combustion chamber 66.

Figure 3:
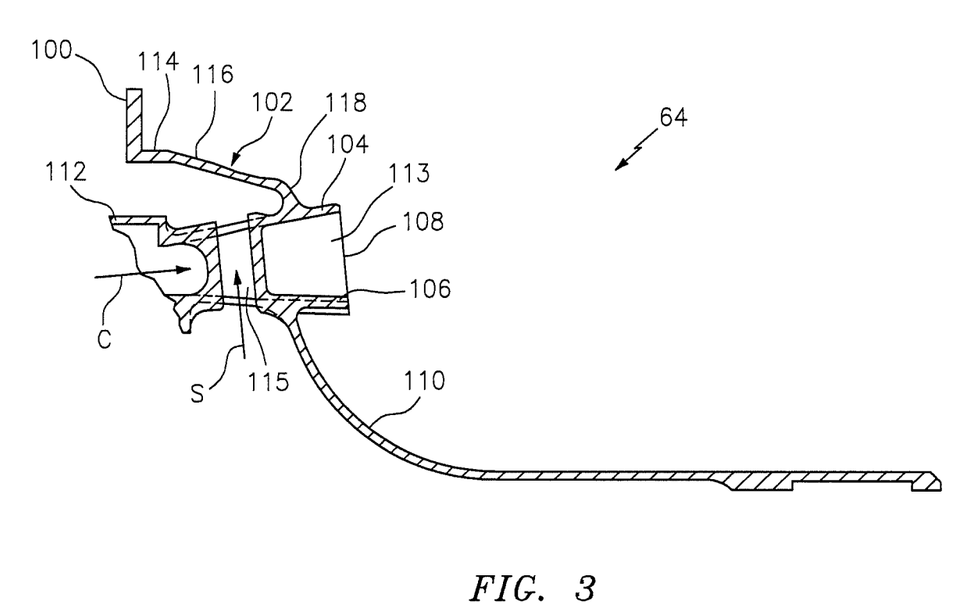
FIG. 3 is a partial longitudinal cross-sectional view of the inner diffuser case of the combustor section.
Figure 4:
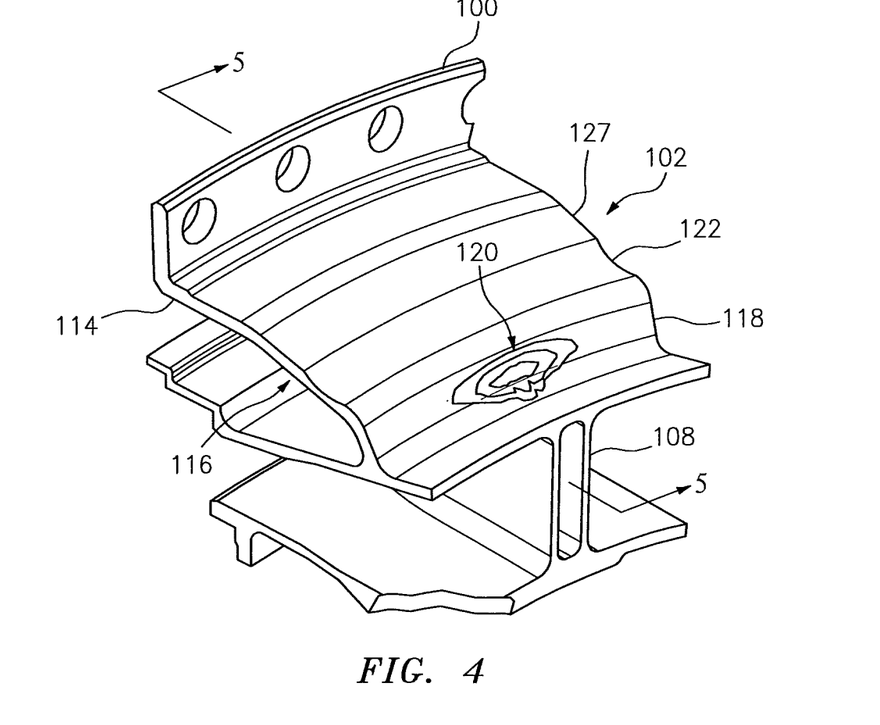
FIG. 4 is a partial perspective view of the inner diffuser case.

With reference to FIGS. 2-4, the inner diffuser case 64 has a flange 100, a structural cone portion (also referred to herein as 'structural cone') 102, outer and inner shrouds 104, 106, a plurality of circumferentially spaced struts 108 and a shell 110. The flange 100 is generally annular and circumferentially continuous, providing detachable engagement in an axial direction to the engine case or static structure 36. The structural cone 102 spans from the flange in a downstream and radially inward direction to the outer shroud 104. The outer shroud 104 projects therefrom in an upstream direction to a distal ring shaped end 112. The plurality of struts 108 span radially from the outer shroud 104 to the inner shroud 106, and generally lie along respective planes transverse to the engine axis A. The shell 110 extends in a curved fashion, and in a radially inward and axially downstream direction from the inner shroud 106.

Compressed airflow C travels from the upstream HPC 52, through an annular flow path 113 (FIGS. 2, 3) defined radially between the outer and inner shrouds 104, 106 (FIG. 3), and into the outer and inner plenums 76, 78 and combustion chamber 66. The inner plenum 78 is generally defined radially between the shell 110 of the diffuser case 64, the radially inward portion of the forward assembly 80, and the support shell 70 of the combustor inner wall 62.

The struts 108 may be open or hollow, thus defining passages 115 for the secondary flow of metered air as illustrated schematically by arrows S. This secondary flow of metered air S is typically sourced from the compressor section 24 and may be utilized, for example, as the reaction force to the axial forces on the high spool 32 (FIG. 1) such that the bearing structures 38 (see FIG. 1), on which the outer shaft 50 is supported, has an acceptable level of axial load or thrust balance. Such flow can also be used to cool the HPC 52 rotor.

The structural cone 102 of the diffuser case 64 may have an upstream portion 114, a mid portion 116 and a downstream portion 118. The upstream portion 114 may be substantially ring shaped and span in a downstream direction from the flange 100 to the mid portion 116. The mid portion 116 is substantially frustum shaped and spans in a downstream and radially inward direction from the upstream portion 114 to the downstream portion 118. The downstream portion 118 is substantially annular in shape and extends substantially in a radial inward direction from the mid portion 116 to (e.g., integrally formed with) the outer shroud 104.

The structural cone 102 of the inner diffuser case 64 and particularly the downstream portion 118 of the structural cone 102 are exposed to localized stresses at stress regions 120 (see FIG. 4) driven primarily by thermal transients, and which can degrade component durability. These localized stresses may occur at the downstream portion 118 and immediately radially outward of the circumferentially spaced struts 108. Such thermal transients may be more prevalent with the higher temperature ranges of the geared turbofan applications and/or where the struts of a diffuser case are open. However, it is understood that the concern of localized stresses upon the structural cone is prevalent in any gas turbine engine.

Figure 5:
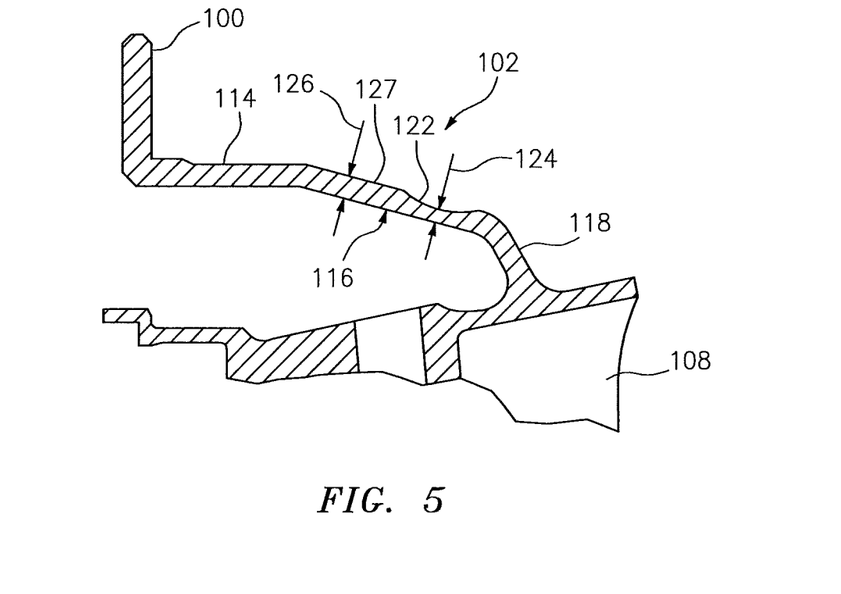
FIG. 5 is a partial cross-sectional view of the diffuser case taken along line 5-5 of FIG. 4.

Localized stresses, schematically illustrated at localized stress region 120, can be reduced (for example) by about ten percent thus doubling the durability life of the diffuser case 64, while decreasing overall weight, by strategically reducing the wall thickness of the surrounding structure. As illustrated, where the localized stress at region 120 is experienced in the downstream portion 118 of the structural cone 102, reducing the wall thickness of at least a part of the mid portion 116 reduces the adjacent localized stress at stress region 120. As best shown in FIGS. 4-5, the portion of reduced wall thickness area (also referred to herein as 'compliance feature 122') may be operatively disposed in a substantially downstream region of the mid portion 116 of the structural cone 102, and may be circumferentially continuous for ease of manufacturing. The width of the recess defined by compliance feature 122 (substantially in an axial direction) is about twenty-five to thirty-five percent of the total width of the mid portion 116. The decrease in a wall thickness 124 of the compliance feature 122 can be about fifteen to fifty percent of the adjacent wall thickness 126 of the remaining segment 127 of the mid portion 116 to be effective, and preferable is about thirty-five percent. Positioning the compliance feature 122 more toward downstream portion 118 and thus away from the upstream flange 100 preserves the integrity of the flange engagement and maintains structural rigidity of the cone 102. The wall thicknesses of the upstream portion 114 and the downstream portion 118 may be about equal to the wall thickness 126 of segment 127.

Figure 6:
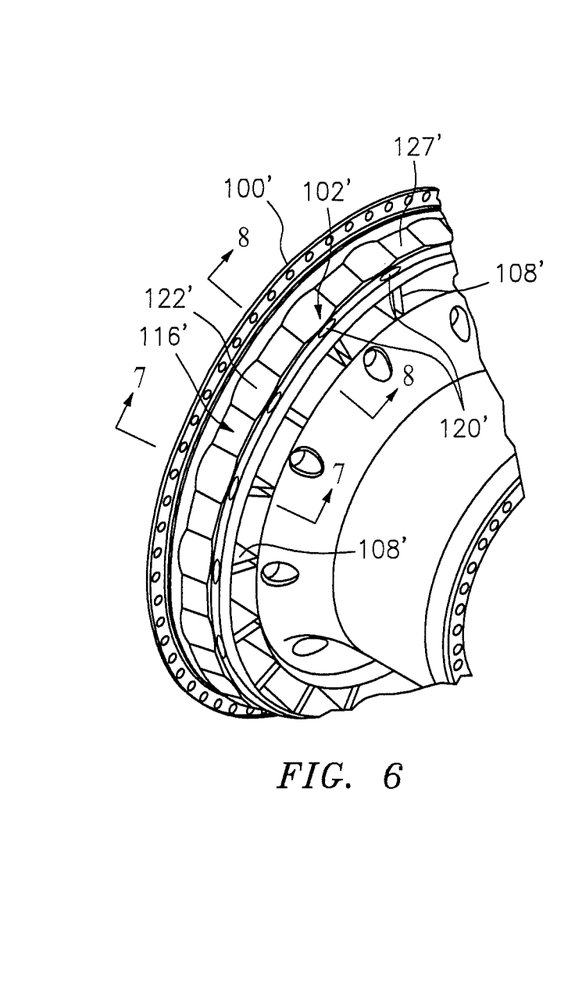
FIG. 6 is a partial perspective view of a second non-limiting embodiment of an inner diffuser case.
Figure 7:
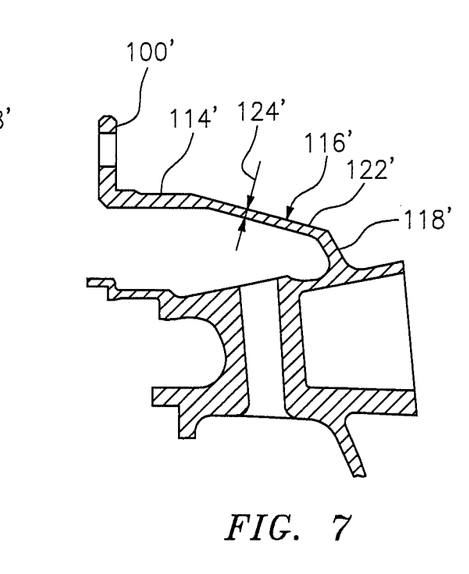
FIG. 7 is a partial cross-sectional view of the inner diffuser case taken along line 7-7 of FIG. 6.
Figure 8:
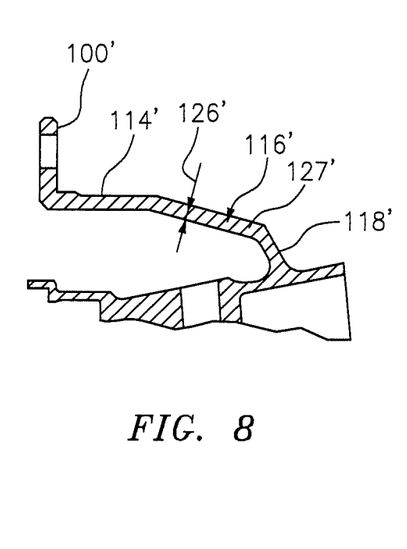
FIG. 8 is a partial cross-sectional view of the inner diffuser case taken along line 8-8 of FIG. 6.

In a second non-limiting embodiment and as best shown in FIGS. 6-8, like elements to the first embodiment have like identifying numerals except with the addition of a prime symbol. In this alternative, a plurality of compliance features 122' in a mid portion 116' are spaced circumferentially from one-another wherein each compliance feature 122' is centered to and disposed radially outward from a respective one of a plurality of struts 108' and thus adjacent to localized stress regions 120' in the downstream portion 118'. Each compliance feature 122' may span substantially or completely from the upstream portion 114' to the downstream portion 118'. The remaining segments 127' of the mid-portion 116' are centered circumferentially between the struts 108' and thus further from the localized stress regions 120'. The wall thicknesses 124', 126' of the respective compliance feature 122' and segment 127' are similar to that of the first embodiment; and, the greater wall thickness 126' of the mid portion 116' may still be needed to maintain structural rigidity of the structural cone 102' and flange 100'.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A diffuser case configured for a gas turbine engine, the diffuser case comprising:
   a flange;
   an outer shroud;
   a strut projecting radially inward from the outer shroud; and
   a structural cone centered about an axis and comprising a first portion and a second portion, the structural cone having a first end connected to the flange and a second end connected to the outer shroud, the structural cone including an inner radial surface and an outer radial surface, each of the inner radial surface and the outer radial surface extending between the first end and the second end, the first portion extending aft from a first axial end of the first portion to a second axial end of the first portion located adjacent the second portion,
   wherein the first portion has a first wall thickness between the inner radial surface and the outer radial surface at the first axial end and a second wall thickness between the inner radial surface and the outer radial surface at a compliance feature of the first portion disposed at a position between the first axial end and the second axial end radially outward of the strut, wherein the second wall thickness is less than the first wall thickness, and
   wherein a body of the first portion between the compliance feature and the first axial end of the first portion defines a segment having a constant thickness between the inner radial surface and the outer radial surface equal to the first wall thickness, and the second portion has a third wall thickness between the inner radial surface and the outer radial surface equal to the first wall thickness.

2. The diffuser case of claim 1, wherein the structural cone has a stress region subject to localized stresses, wherein the compliance feature has a first wall thickness that is less than a second wall thickness of the segment, wherein the stress region is disposed between the compliance feature and the second end of the structural cone.

3. The diffuser case of claim 2, further comprising: wherein the strut projects radially between the outer shroud and an inner shroud, the outer shroud and the inner shroud defining an annular flowpath radially therebetween.

4. The diffuser case of claim 3, wherein the strut comprises a passage extending radially through the strut between an outer radial opening in the outer shroud and an inner radial opening in the inner shroud.

5. The diffuser case of claim 2, wherein the second will thickness is fifteen to fifty percent less than the first wall thickness.

6. The diffuser case of claim 3, wherein the second portion is disposed downstream from the first portion, the second portion connecting the second axial end of the first portion to the outer shroud; and
   wherein the second portion includes the stress region.

7. The diffuser case of claim 6, wherein the structural cone further comprises a third portion disposed upstream from the first portion, the third portion connecting the flange to the first axial end of the first portion.

8. The diffuser case of claim 7, wherein the flange projects radially outward from the third portion.

9. The diffuser case of claim 6 further comprising:
the strut being one of a plurality of struts being circumferentially spaced from one another; and,
the stress region being one of a plurality of stress regions disposed in the second portion, each stress region of the plurality of stress regions disposed radially outside a respective strut of the plurality of struts.

10. The diffuser case of claim 7, wherein the first portion and the second portion are circumferentially continuous around the axis, and wherein the segment is located axially between the compliance feature and the flange.

11. The diffuser case of claim 9 further comprising: the segment being one of a plurality of segments spaced circumferentially from one another about the axis; and the compliance feature being one of a plurality of compliance features spaced circumferentially about the axis.

12. The diffuser case of claim 1, further comprising: wherein the compliance feature is spaced from the flange for maintaining engagement integrity of the flange and structural rigidity of the structural cone.

13. The diffuser case of claim 2, wherein the first portion has a first width defined between the first axial end and the second axial end and the compliance feature has a second width, and wherein the second width is between twenty-five to thirty-five percent of the first width.

14. The diffuser case of claim 3, wherein the annular flowpath is configured to direct compressed airflow, at least in part, from a high-pressure compressor of the gas turbine engine to a combustion chamber of the gas turbine engine.

15. The diffuser case of claim 4, wherein the outer radial opening is disposed radially inward and spaced from the first portion.

16. A combustor section of a gas turbine engine, the combustor section comprising:
the diffuser case of claim 1.

17. The combustor section of claim 16 further comprising: wherein the flange is engaged to and disposed upstream from the structural cone.

18. The combustor section of claim 17 further comprising: wherein the strut is disposed radially inward from the second portion; and
wherein a localized stress region is aligned circumferentially and disposed radially outward from the strut.

19. The combustor section of claim 18 further comprising: wherein the compliance feature and the segment are circumferentially continuous and the compliance feature is spaced axially downstream from the flange by at least the segment.

20. The combustor section of claim 18 further comprising:
the strut being one of a plurality of struts spaced circumferentially from one another; and
the compliance feature being one of a plurality of compliance features of the first portion each having the second wall thickness, and wherein each one of the plurality of compliance features is circumferentially aligned and disposed radially outward from a respective strut of the plurality of struts.

* * * * *